Patented Dec. 5, 1950

2,532,475

UNITED STATES PATENT OFFICE 2,532,475

ALKYD RESIN STABILIZED WITH AN N-ARYL-HYDROXY-3-NAPHTHAMIDE

Thomas F. Anderson, Toledo, Ohio, assignor to Libbey-Owens-Ford Glass Company, Toledo, Ohio, a corporation of Ohio No Drawing. Application August 29, 1949, Serial No. 113,019

6 Claims. (Cl. 260—45.9)

The invention relates to stabilized thermosetting compositions, and more particularly to stabilized thermosetting compositions containing a polymerizable unsaturated alkyd resin.

A polymerizable unsaturated alkyd resin (i. e., a polymerizable unsaturated polyhydric alcohol-polycarboxylic acid polyester) is highly advantageous as a starting material for the production of hardened synthetic resins in that it is resinous in character before polymerization, and is fusible at a temperature at which polymerization is not rapid. Other heat-hardenable compositions, such as urea-formaldehyde and phenol-formaldehyde compositions, are much more difficult to fabricate because they do not exist as plastic resins at temperatures much below their hardening temperatures. Since a heat-hardenable composition can be shaped only while it is in a fused condition, the failure of other heat-hardenable compositions to reach a fused state below their hardening temperatures is a great handicap in fabricating operations. By the time a urea-formaldehyde or phenol-formaldehyde composition has reached a fused state in a fabricating operation, its hardening already has begun, so that the hardening interferes with the shaping or molding of the composition.

A saturated heat-hardenable alkyd resin, such as glycerol phthalate, is hardened by esterification with elimination of water. An alkyd resin that is hardened by esterification cannot be employed to make a molded article or other solid body, because it is too difficult to remove water from the interior of such a solid body in order to complete the hardening. Even urea-formaldehyde and phenol-formaldehyde compositions tend to give off small amounts of volatiles as they are hardened in a mold. In contrast, a polymerizable unsaturated polyester hardens by polymerization without evolution of volatiles.

These important advantages have made polymerizable unsaturated polyesters of great commercial value; nevertheless the commercialization of such polyesters has been seriously impeded by the fact that such polyesters lack stability after the addition of the polymerization catalyst that is necessary to cause polymerization to take place. In the manufacture of commercial products from such polyesters, polymerization in the presence of a polymerization catalyst ordinarily is carried out at an elevated temperature in order to cause the polymerization to take place rapidly. After the addition of a polymerization catalyst to such a polyester, however, polymerization proceeds slowly at atmospheric temperatures. The rate of polymerization at atmospheric temperatures after the incorporation of a polymerization catalyst is rapid enough so that in a few days the polyester may become a substantially infusible, worthless mass that cannot be formed into any useful product.

The useful life of a polymerizable unsaturated polyester after incorporation of a polymerization catalyst is so short that it does not afford sufficient time for a manufacturer to ship the catalyst-containing polyester to a user. For that reason it has been the invariable practice heretofore for the manufacturer of a polymerizable unsaturated polyester to ship the polyester without incorporating the polymerization catalyst, so that it has been necessary for the user of the polyester to add the required proportion of the catalyst just before the polyester is used. The minute proportion of a polymerization catalyst required for a small batch of the material must be weighed out very accurately, then incorporated very uniformly throughout the batch. Uniform incorporation of a catalyst in a solid material such as a molding composition is a particularly difficult operation and requires very expensive equipment. The relatively great expense of incorporating the catalyst in a solid material has had the effect of prohibiting the use of molding compositions containing polymerizable polyesters.

The principal object of the invention is the stabilization of a polymerizable unsaturated polyester containing a polymerization catalyst. More specific objects and advantages are apparent from the following description, which illustrates and discloses but is not intended to limit the scope of the invention.

Since a stabilized thermosetting composition embodying the invention does not require the incorporation of a catalyst by the user, it can be used by small fabricators who have been unable heretofore to make use of polymerizable unsaturated polyesters, and can be used more economically by large fabricators than a material requiring the addition of a catalyst by the user.

Certain "inhibitors" for the polymerization of unsaturated polyesters are known. It has been found, however, that the addition of such an inhibitor to a mixture of a polymerizable unsaturated polyester and a polymerization catalyst has no better effect than the omission of part of the polymerization catalyst from the mixture. The addition of such an inhibitor not only retards the polymerization of the mixture at atmospheric temperatures to the same extent as the polymerization would have been retarded by omission of a certain proportion of the polymerization catalyst from the mixture, but also interferes with the polymerization at molding temperatures so as to impair the quality of the molded product to the same extent as the quality would have been impaired if that same proportion of the polymerization catalyst had been omitted. These inhibitors are of no value for the purpose of stabilization, because it is useless to add an inhibitor when exactly the same effect can be obtained by omitting part of the polymerization catalyst.

The present invention is based upon the discovery that a certain type of substance, in conjunction with oxygen, produces upon a mixture of a polymerizable unsaturated polyester and a polymerization catalyst a novel effect that is of great commercial importance, i. e., has the effect of greatly retarding the polymerization at atmospheric temperatures of a mixture of a polymerizable unsaturated polyester and a polymerization catalyst, without producing a corresponding impairment of the quality of the molded product. Such a substance is referred to hereinafter as a "stabilizer" to distinguish it from an ordinary inhibitor.

The stabilizing effect upon a mixture of a polymerizable unsaturated polyester and a polymerization catalyst that is produced in the practice of the present invention is the combined effect of oxygen and a stabilizer. Such stabilizing effect cannot be produced by the stabilizer alone or by oxygen alone.

In order to produce the stabilizing effect in the practice of the invention a polymerizable unsaturated polyester, a polymerization catalyst and a stabilizer of the invention are carried on a filler in contact with air. A polymerizable unsaturated polyester is normally a liquid, but in a material properly prepared from a filler and a composition consisting principally of such a polyester, the polyester composition is carried on the filler in contact with air. When the resulting material contains a stabilizer of the present invention in addition to a polymerization catalyst, it is stable by reason of the combined action of the stabilizer and the oxygen of the air.

Thus, a composition of the invention comprises a polymerizable unsaturated polyester, a polymerization catalyst and a stabilizer, carried on a filler in contact with air. Preferably the composition also contains a polymerizable unsaturated monomeric substance. The properties of finished articles produced by polymerization of a composition embodying the invention are better when the composition contains a polymerizable unsaturated monomeric substance, so that such a substance is ordinarily used in the composition. It is believed that because of their large size the polyester molecules are not mechanically well adapted to polymerize with one another and that the better properties of finished articles produced from a composition containing a polymerizable unsaturated monomeric compound are due to the superior curability of such a composition. The monomeric compound is believed to impart better curability to the composition because of its ability to cross link the unsaturated polyester molecules by copolymerizing with such molecules.

In the practice of the present invention, the proportions of the polyester, the monomeric compound (if any) and the filler are such and the physical form of the composition is such that the filler carries the other ingredients of the composition in contact with air.

Thus, a composition embodying the invention may be carried on a filler in contact with air if the remaining ingredients of the composition form a liquid having a viscosity low enough so that it can be absorbed by the filler and if the proportion of the filler is sufficient to absorb all of such liquid. The physical form of the composition then is the same as the physical form of the filler and the filler absorbs the liquid containing the remaining ingredients of the composition and thus carries such ingredients in contact with air. However, such a composition, consisting of a filler in which a liquid containing the remaining ingredients of the composition is absorbed, is inconvenient to use and would not ordinarily be employed in commercial practice. When an attempt is made to produce articles from such a composition by ordinary molding procedures, the liquid absorbed by the filler, because of its low viscosity, may be squeezed out of the filler and squirted out of the mold, and the separation of the liquid from the filler may result in the production of molded articles that are not homogeneous. Moreover, the proportion of filler in such a composition must be relatively high in order that the filler may absorb all of the liquid containing the remaining ingredients of the composition.

Ordinarily, it is not desirable that the ingredients other than the filler form a liquid of relatively low viscosity, because it is the low viscosity of such liquid that causes it to be squeezed out of the filler during molding so as to produce molded articles that are undesirably non-homogeneous; yet the ingredients of the composition other than the filler must form a liquid of relatively low viscosity if all of such liquid is to be absorbed by the filler.

Therefore, it is preferable to select a polymerizable unsaturated polyester that is viscous enough, and to keep the proportion of any liquid monomeric compound in the composition low enough, so that the ingredients of the composition other than the filler form a liquid of relatively high viscosity. Such a liquid usually is only incompletely absorbed by the filler and tends to coat the filler so as to form a dough or solid mass. In the practice of the invention, such a dough or solid mass must be put into a physical form in which the filler carries the other ingredients in contact with air. A dough may be put into such a physical form by rolling it into a sheet not more than about one-quarter inch thick. The proportion of filler in the composition should be sufficient to permit the dough to be rolled into a continuous sheet, and the tackiness of the liquid formed by the ingredients other than the filler should be great enough to permit the sheet to be handled without crumbling. The rolling of the dough or putty-like material into a sheet involves the generation of heat by friction, and it is desirable after the sheet is formed to spread it out on a solid surface until it has cooled to the temperature of the atmosphere. The sheet may then be rolled up or folded up and placed in a container for shipment.

It has been found that when a filler is mixed with a viscous liquid containing the remaining ingredients of the composition to form a dough or putty, which is then rolled into a sheet, and when the resulting sheet is allowed to cool and then is rolled up or folded up and placed into a container for shipment, the filler carries the remaining ingredients of the composition in contact with air so as to form a stable material. It has been found that the material so prepared remains in sheet form even though the dough or putty from which the sheet material was rolled would have coalesced to a solid mass if the dough or putty had been merely cut into small pieces and placed in the same container. The sheets of the material seem to be self-supporting so that the material does not coalesce into a solid mass. The natural irregularity and roughness of the sheets permit air to remain between the sheets even when the sheets are in contact with one another. That the sheet form of the material is permanent although small pieces of the same material tend to coalesce into a solid mass is explained by the fact that whether a sheet stands upright in a container or is folded over, the material is supported in sheet form in accordance with the well-known mechanical principles of the column and the arch. If the same dough or putty-like material is cut into small pieces and placed in a container, the full weight of the material in the upper part of the container is transmitted as a pressure upon the material in the lower part of the container which causes the pieces to coalesce into a solid mass.

Similar results can be obtained by extruding a dough or putty-like material in the form of rods or ribbons having a maximum thickness of about one-quarter inch instead of rolling it into a sheet. After the rods or ribbons have cooled to atmospheric temperature, they can be placed in a container for shipment.

In many cases it is possible to prepare the material in a form that is still more desirable than the sheets, rods or ribbons hereinbefore described. This most desirable form of the material can be obtained by the use of a polymerizable unsaturated polyester that is a liquid of very high viscosity or a liquid that can be caused to undergo substantial crystallization. By mixing the proper proportion of a filler with a liquid polyester of very high viscosity it is possible to prepare a material that when passed between rolls under pressure produces a sheet having a leathery texture, i. e., the feel and general appearance of crude leather. The resulting leathery sheet may be chopped into fragments that do not coalesce when stored in an ordinary shipping container. If the fragments of such a leathery material embodying the invention have a maximum diameter not greater than about one-quarter inch, the filler carries the remaining ingredients of the composition in contact with air and the composition remains stable when placed in an ordinary shipping container.

A polymerizable unsaturated polyester that tends to crystallize is particularly useful in the practice of the present invention. When a composition embodying the invention containing a polyester that tends to crystallize is prepared, the ingredients of the composition may be mixed while warm and the composition may then be cooled, preferably while in the form of a sheet. As the composition cools, the polyester crystallizes, at least to some extent, and the tackiness of the composition is thereby greatly reduced. The cooled composition, being relatively non-tacky, may be cut into small fragments that do not coalesce when placed in a shipping container. If the fragments in the shipping container have a maximum diameter of not more than about one-quarter inch, the filler carries the remaining ingredients of the composition in contact with air.

A composition that is shipped in the form of small fragments or granules is much more convenient for use in molding and is commercially more acceptable than a composition that is shipped in the form of sheets. Thus the preferred compositions embodying the invention are those that are sufficiently non-tacky so that they may be divided into granules that do not coalesce when stored in a container. As a matter of fact, such a composition is hard enough so that it would be necessary to divide the composition into small fragments in any case before the composition could be molded. Sheets of such a hard composition would not ordinarily be placed in a mold in commercial practice because the material would flow more readily and fill the mold better if it were cut into small fragments before being placed in the mold. On the other hand, when a composition embodying the invention is tacky enough so that it must be stored and shipped in the form of sheets to prevent it from coalescing into a solid mass, the composition usually is soft enough so that the sheet itself may be folded up and placed directly in the mold.

STABILIZER

A stabilizer of the invention is an agent which, acting in combination with the oxygen of the air, increases the stability at atmospheric temperatures of a composition comprising a polymerizable unsaturated polyester and a catalyst without proportionately decreasing the curability of the composition. The stabilizer in a composition embodying the invention is an N-aryl-hydroxy-3-naphthamide in which each nitrogen atom is connected only to atoms other than nitrogen and oxygen.

The "N-aryl" radical in the molecule of an N-aryl-hydroxy-3-naphthamide may be a phenyl radical or a naphthyl radical or a nuclearly-substituted phenyl or naphthyl radical. Nuclear substituents which may be in all possible positions on the hydroxy naphthamide radical as well as on the N-aryl radical include alkyl, alkenyl, aryl, alkaryl, aralkyl, carboxy, hydroxy and sulfo radicals, and halogens having an atomic weight greater than 35 (i. e., chlorine, bromine and iodine), but do not include, for example, nitro, arylazo and isonitroso radicals, for in the latter radicals a nitrogen atom is connected to a nitrogen or oxygen atom. The hydroxy radical in the hydroxy naphthamide nucleus may be in any position, for example, the 1-position, but it is preferable that it be in the 2-position and that any additional hydroxy radicals be attached to the N-aryl nucleus.

An alkyl radical attached to a nucleus in the molecule of the N-aryl-hydroxy-3-naphthamide may contain from 1 to 18 carbon atoms and may be a primary, secondary or tertiary radical (e. g., methyl, ethyl, propyl, isopropyl, n-butyl, isobutyl, secondary butyl, tertiary butyl, or any primary, secondary or tertiary alkyl radical having from 5 to 18 carbon atoms). An alkenyl radical attached to a nucleus may be a radical containing from 2 to 8 carbon atoms (e. g., vinyl, or a propenyl, butenyl, pentenyl, hexenyl, heptenyl or octenyl radical). Such alkyl and alkenyl radicals, which may be substituted with halogens having an atomic weight greater than 35, amino groups, formyl radicals or hydroxy groups, may be attached to a nucleus through an oxygen atom, i. e., may be contained in alkoxy radicals.

An aromatic radical attached to a nucleus may be phenyl or a naphthyl, alkyl phenyl or alkyl naphthyl radical. When the aromatic radical is an alkyl phenyl or alkyl naphthyl radical, each alkyl group may have from 1 to 18 carbon atoms, and may be primary, secondary or tertiary (as hereinbefore described), but the total number of carbon atoms in all the alkyl groups should not exceed 25. The maximum number of alkyl groups is permissible, so that when the aromatic radical is an alkyl-substituted phenyl radical, for example, there can be any combination of from one to five alkyl groups each having from 1 to 18 carbon atoms, provided that the total number of carbon atoms in the alkyl groups does not exceed 25. Similarly, when the aromatic radical is an alkyl-substituted naphthyl radical there can be as many as seven alkyl groups. Such aromatic radicals, which may also be substituted with halogens having an atomic weight greater than 35, amino, formyl and hydroxy groups, include: tolyl, xylyl, ethylphenyl, mesityl, methylethylphenyls, isobutylphenyl, cumenyl, diethylphenyls, tetramethylphenyl, pentamethylphenyl, amylphenyl, butylmethylphenyls, propyldimethylphenyls, propylethylphenyls, hexylphenyl, amylmethylphenyl, butylethylphenyl, butyldimethylphenyl, propylethylmethylphenyl, dipropylphenyl, 1-methylnaphthyl, 1-ethylnaphthyl, bromophenyl, o-bromotolyl, m-bromotolyl, p-bromotolyl, o-chlorotolyl, m-chlorotolyl, dichloroxylyl, beta-hydroxyphenyl, beta-hydroxy naphthyl, 4-bromo-1-isopropylphenyl, 4-bromo-1-methyl-3-isopropyl phenyl, 4-bromo-1-butyl phenyl, 4-bromo-1-tertiary butyl phenyl, 1-chloro-4-bromophenyl, 1-chloro-4-ethylphenyl, beta-bromonaphthyl, 2-chloronaphthyl, 1-bromo-3-chloronaphthyl, 2-chloro-1-methyl naphthyl, 1-bromo-8-methyl naphthyl, and 1-bromo-2,7-dimethyl naphthyl radicals.

An aralkyl radical attached to a nucleus may consist of an alkyl radical (as hereinbefore described) in which one hydrogen atom has been replaced by an aromatic radical (as hereinbefore described). Such aralkyl radicals include benzyl, phenylethyl, phenylpropyl, phenylbutyl, naphthylethyl and naphthylmethyl radicals.

It is preferred that the N-aryl radical in an N-aryl-hydroxy-3-naphthamide be one having six nuclear carbon atoms (i. e., phenyl, or a nuclearly substituted phenyl radical in which any carbon atoms in the nuclear substituents are contained in aliphatic radicals). It is most desirable that the N-aryl radical be a monovalent hydrocarbon radical of the benzene series having not more than seven carbon atoms (i. e., phenyl, or a methylphenyl radical). Preferred stabilizers which may be used in the practice of the present invention include N-p-tolyl-2-hydroxy-3-naphthamide,

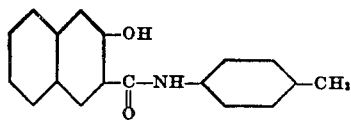

and N-phenyl-2-hydroxy-3-naphthamide,

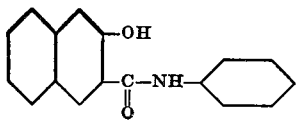

CATALYST

A stabilized thermosetting composition of the invention contains a catalyst of the class consisting of organic peroxides and organic ozonides, which is essential for rapid polymerization of the composition at molding temperatures. The term "organic peroxides" includes compounds having the general formula $$R\!-\!O\!-\!O\!-\!Y$$

wherein R is alkyl, aralkyl, acyl, or hydroxy-substituted or halo-substituted alkyl, aralkyl or acyl, and Y is hydrogen, or is of the same class as R.

Acidic peroxides in which Y and R are acyl or hydroxy- or halo-substituted acyl, which may be used as catalyst in the practice of the invention include: bis(benzoyl) peroxide, bis(p-bromobenzoyl) peroxide, bis(phthalyl) peroxide, bis(p-chlorobenzoyl) peroxide, bis(dichlorobenzoyl) peroxide, bis(succinyl) peroxide, acetyl benzoyl peroxide, bis(acetyl) peroxide and bis(chloroacetyl) peroxide.

Peroxy acids in which R is acyl and Y is hydrogen, and peroxy acid esters in which R is acyl and Y is alkyl or aralkyl, which act as curing catalysts in the present invention, include peracetic acid, perbenzoic acid, t-butyl perbenzoate and benzyl peracetate.

Hydrogen peroxides in which R is alkyl or aralkyl and Y is hydrogen, which act as curing catalysts in the present invention, include t-butyl hydroperoxide.

Organic ozonides which may be used as curing catalysts in the practice of the present invention include diisopropylene ozonide and diisobutylene ozonide.

Mixtures of organic peroxides and organic ozonides may also be used as the curing catalyst. Organic peroxides in which R is benzoyl- or halo-substituted benzoyl such as benzoyl peroxide (i. e., bis(benzoyl) peroxide), bis(p - chlorobenzoyl) peroxide, bis(p - bromobenzoyl) peroxide, bis(dichlorobenzoyl) peroxide, and t-butyl perbenzoate, are very effective in the production of molded products having good cured quality.

FILLER

A stabilized thermosetting composition of the present invention is in a physical form such that air permeates the composition. A stabilized thermosetting composition of the invention contains a filler which carries the other ingredients in contact with air. The filler may be an organic filler (i. e., a filler from a vegetable or animal source) or an inorganic or mineral filler. Organic fillers which may be used include alpha cellulose, which is the purest and lightest-colored organic material ordinarily available. Inorganic or mineral fillers which may be used include fibrous fillers such as glass fiber or asbestos, and non-fibrous fillers such as ground glass, clay, mica, talc or calcium silicate.

POLYMERIZABLE UNSATURATED ALKYD RESIN

The choice of the filler which carries the other ingredients of a thermosetting composition embodying the present invention in contact with air varies with the properties of the polymerizable unsaturated alkyd resin (i. e., polymerizable unsaturated polyhydric alcohol-polycarboxylic acid polyester) used in the thermosetting composition, as well as with the specific properties desired in the final product. Any unsaturated polyester that is polymerizable into an infusible resin at ordinary molding temperatures, or any mixture of such materials with one another or with one or more other materials which may or may not be polymerizable, may be used in the practice of the present invention. The polymerizable unsaturated polyester may be a limpid liquid of very low viscosity, or a tacky, viscous liquid, or may be of any consistency depending upon the materials used in its preparation and the degree to which they are reacted.

When the polymerizable unsaturated polyester is a liquid of very low viscosity, it can be carried in admixture with a catalyst and a stabilizing agent (as hereinbefore defined) on a filler in contact with air in the form of a damp powder. That is, a highly absorbent filler may be used which can absorb a large quantity of the other ingredients without being dissolved or swelled by the other ingredients, so that the composition has essentially the form of the filler. (Swelling of the filler indicates a tendency for the filler to be soluble in the liquid ingredients, so that, instead of a composition having essentially the form of the dry fibrous filler, a dough or gelatinous mass is obtained.)

In the preparation of a composition embodying the invention having a leathery texture, when the ingredients other than the filler form a very tacky liquid, a given amount of a highly absorbent filler causes a greater reduction in tackiness (with subsequent increase in ease of granulating) than an equivalent amount of a less absorbent filler. However, although an inorganic or mineral filler may be less absorbent than an organic filler and therefore may be required in a higher proportion to obtain the desired leathery texture, it still may be preferred for the improved electrical properties that such a filler imparts.

A polymerizable unsaturated polyester is prepared by reaction of a polyhydric alcohol with a polybasic acid. It is preferable to employ a dihydric alcohol and a dibasic acid in order to produce a product in which there is a maximum esterification of the acid and alcohol radicals without excessive viscosity. Ordinarily it is desirable that the unsaturated polyester be polymerizable into an infusible or high melting point resin so that the proportion of unsaturated components should be such that the polyester contains an average of more than one double bond per molecule; for example, there may be an average of eleven or more double bonds in every ten molecules of the polyester.

The polymerizable unsaturated polyester may be produced by reaction of any desired combination of polybasic acid and polyhydric alcohol. For example, an unsaturated dibasic acid such as maleic, fumaric, itaconic, citraconic or mesaconic acid may be reacted with a dihydric alcohol such as any polymethylene glycol in the series from ethylene glycol to decamethylene glycol, propylene glycol, any butylene glycol, any polyethylene glycol in the series from diethylene glycol to nonaethylene glycol, dipropylene glycol, any glycerol monobasic acid monoester (either in the alpha or beta position), such as monoformin or monoacetin, any monoether of glycerol with a monohydric alcohol, such as monomethylin or monoethylin, or any dihydroxy alkane in which the alcohol radicals are primary or secondary or both, in the series from dihydroxy butane to dihydroxy decane.

Instead of a single polybasic acid, a mixture of polybasic acids may be employed, such as a mixture of an unsaturated dibasic acid with a polybasic acid containing more than two acid radicals, such as citric acid. A mixture of polyhydric alcohols may be employed, such as a mixture of a dihydric alcohol with a polyhydric alcohol containing more than two alcohol radicals, such as glycerol.

In the preparation of the polymerizable unsaturated polyester, any of the usual modifiers such as monobasic acids, monohydric alcohols and natural resin acids may be added. The larger the proportions of monobasic acids and monohydric alcohols, the lower is the average number of acid and alcohol residues in the resulting polyester molecules, and the lower is the viscosity of the polyester. On the other hand, the more nearly equal the molecular proportions of dibasic acid and dihydric alcohol, the greater is the average number of residues in the resulting polyester molecules, and the greater is the viscosity. The proportions of ingredients used are those proportions that produce a polymerizable polyester of the desired viscosity. Other properties of the polyester, such as solubility in various solvents, also may be varied by selecting various reacting ingredients and varying their proportions. The infusibility, hardness and inertness of the product obtained by polymerization of the polyester may be increased by varying the initial reacting ingredients to increase the average number of double bonds per molecule of the polymerizable polyester.

The point to which the reaction of the ingredients is carried in the preparation of the polymerizable polyester is simply that point at which the product has the desired properties. The consistency or viscosity of the polyester varies directly with the average number of acid and alcohol residues in the molecule. For example, the average number of residues in the molecule of the polyester may vary from about three to about one hundred twenty.

If desired, the reaction may be expedited by use of an acid substance as a catalyst. Any organic acid, inorganic acid or acid salt that is soluble in the reaction mixture may be employed as a catalyst, but it is desirable that any acid substance used be readily volatile or be of such a character that it has no deleterious effect in the final product. The amount of acid catalyst employed is simply that amount which accelerates the esterification to the desired degree.

The reaction is carried out at a temperature high enough and for a time long enough to secure the desired consistency. An elevated temperature preferably is employed to expedite the reaction, but during the preparation of the polyester, the temperature should not be so high nor the time of reaction so long as to cause substantial polymerization. There is less danger of premature polymerization if an inhibiting agent is added before the esterification is carried out.

Whenever added, an inhibiting agent is used in the proportion required to give the desired degree of inhibiting effect. It may be necessary to use different inhibitors in widely different proportions in order to secure the same inhibiting effect.

Any desired inhibitor such as hydroquinone, pyrogallol, tannic acid or any aromatic amine, such as aniline or phenylene diamine may be employed as an inhibitor.

The preparation of the unsaturated polyester preferably is carried out in an atmosphere of an inert gas such as carbon dioxide, nitrogen or the like, in order to prevent darkening or to make it possible to obtain a pale or colorless product. Bubbling the inert gas through the reacting ingredients is advantageous in that the gas serves the added functions of agitation and of expediting the removal of water formed by the reaction. Exclusion of oxygen is desirable not only because it causes discoloration, but also because it tends to produce premature polymerization at the elevated temperatures used.

The acid number of the product depends upon the degree of reaction and the proportions of acid and alcohol used for the reaction. With equimolecular proportions of dibasic acid and dihydric alcohol, the reaction may be carried to an acid number of about 20. The use of an acid catalyst may make it possible to attain a lower acid number without substantial polymerization.

A polymerizable polyester may be prepared by the following procedure:

5.4 mols of maleic anhydride and 5.4 mols of diethylene glycol are mixed together in a three-necked flask. The flask is then fitted with a thermometer, a tube leading to a condenser and an inlet tube through which is introduced a moderate stream of carbon dioxide, and is lowered into an oil bath at a temperature of 210° C. During the subsequent reaction the distillate may be analyzed, and a sufficient amount of the ingredient lost in excess may be added to the flask from time to time to maintain the initial proportions of reacting ingredients. If the only addition is a sufficient amount of the ingredient lost in excess to maintain the initial proportions, the rate of removal of unreacted ingredients gradually decreases and substantially no unreacted ingredients may be left in the composition at the end of the reaction. After 8 hours at such temperature, a polyester is obtained in the form of a stiff liquid having an acid number of 18. If ethylene glycol were substituted for the diethylene glycol in the foregoing procedure, it would be difficult to reduce the acid number below 40 without causing polymerization, and the product would be a very thick gum.

Alternatively, this first procedure, as described in the foregoing paragraph, may be employed except that 1.5 instead of 5.4 mols of maleic anhydride and 1.5 instead of 5.4 mols of diethylene glycol are used together with an amount of hydroquinone equal to .02 per cent of the reacting ingredients; and reaction is continued for 6¼ hours. The resulting polyester is a moderately stiff liquid having an acid number of 11.

A further procedure that may be used is the same as the first procedure except that 2 instead of 5.4 mols of maleic anhydride and 2.1 instead of 5.4 mols of diethylene glycol are used; and the reaction is carried out for 4½ hours to produce a stiff liquid having an acid number of 14.

Another type of polymerizable polyester may be prepared by a procedure that is the same as the first procedure except that 3 instead of 5.4 mols of maleic anhydride and 3.3 instead of 5.4 mols of diethylene glycol are used together with an amount of hydroquinone equal to .09 per cent of the reacting ingredients and an amount of p-toluene sulfonic acid equal to 0.18 per cent of the reacting ingredients; and the reaction is carried out for four hours at 200° C. to produce a stiff liquid having an acid number of 10.6.

As a further alternative, the first procedure may be employed except that 6 instead of 5.4 mols of maleic anhydride are employed; the diethylene glycol is replaced by 6 mols of ethylene glycol; a slower stream of carbon dioxide is used; and the ingredients are kept in an oil bath at 220° C. for 5½ hours. The resulting polyester is a very thick gum having an acid number of 53.

A polymerizable polyester may also be prepared by a procedure that is the same as in the preceding paragraph except that the maleic anhydride is replaced by 5 mols of fumaric acid; the ethylene glycol is replaced by 5 mols of diethylene glycol; and the reaction is continued for 8¼ hours. The resulting polyester is a stiff liquid having an acid number of 23. If in the foregoing procedure the diethylene glycol were replaced by an equimolecular proportion of ethylene glycol and half of the fumaric acid were replaced by an equimolecular proportion of phthalic anhydride, the product would be a hard brittle solid. The substitution of fumaric acid for maleic anhydride increases the length of time required to reach a given acid number at a given temperature. However, the accelerating effect of an acid catalyst upon the esterification is greater when fumaric acid is used. When fumaric acid is employed, other conditions being the same, the resulting polyester tends to be more viscous and greater care is necessary in order to prevent premature polymerization.

As a further variation the first procedure may be used except that the maleic anhydride is replaced by 1.5 mols of fumaric acid; 1.5 instead of 5.4 mols of diethylene glycol are employed; and the temperature is varied between 200 and 220° C. After the reaction has been continued for 2½ hours, the acid number is 73. After 6 hours, the product is a stiff liquid having an acid number of 41.

A polymerizable polyester may also be prepared by a procedure that is the same as that of the preceding paragraph except that p-toluene sulfonic acid (1.5 grams) is added to the initial ingredients; and reaction for only 2½ hours instead of 6 hours is required to produce a stiff liquid having an acid number of 41.

A procedure that may also be used is the same as that of the next to the last paragraph except that the fumaric acid is replaced by 3.3 mols of maleic anhydride; 3.0 instead of 1.5 mols of diethylene glycol are used; 1.5 grams of p-toluene sulfonic acid and 1.3 grams of hydroquinone are added to the initial ingredients; and the reaction is carried out for 3 hours to produce a limpid liquid having an acid number of 26.

A polymerizable polyester may be prepared by a procedure that is the same as the next to the last paragraph except that 3 instead of 1.5 mols of fumaric acid and 3.3 instead of 1.5 mols of diethylene glycol are used; and the reaction is carried out for 3 hours at temperatures ranging from 200–210° C. to produce a stiff liquid having an acid number of 12.

A further procedure that may be used is the same as that of the next to the last paragraph except that the hydroquinone is omitted; and reaction for 5 hours is required to produce a stiff liquid having an acid number of 28.

Another procedure that may be used is the same as the procedure of the next to the last paragraph except that the weight of p-toluene sulfonic acid is equal to 0.18 per cent of the weight of the reacting ingredients; an amount of hydroquinone equal to 0.09 per cent of the reacting ingredients is added at the start of the reaction; and reaction is carried out at 200° C. for 5 hours to produce a stiff liquid which has an acid number of 10.1.

MONOMERS

Although a polymerizable unsaturated polyester may be used alone as the polymerizable binder in the practice of the present invention, it is often desirable to incorporate a polymerizable unsaturated monomeric substance along with the polymerizable unsaturated polyester. At molding temperatures the monomer aids in curing by cross linking straight chain polyester molecules. The combination of the polyester and the monomeric compound usually polymerizes more rapidly than either of such substances alone. When used in the proper proportions the monomer improves the water resistance and insolubility of the final product.

The use of a substantial proportion of a liquid monomer may be necessary in preparing a thermosetting composition which is a damp powder from a somewhat tacky polyester. In order to get the polyester in a form in which it is readily absorbed by the filler so that the composition will have essentially the form of the filler, a sufficient amount of a liquid monomeric substance is incorporated in the polyester to give it a low enough viscosity so that it can be readily absorbed.

A polymerizable unsaturated monomeric substance used in the practice of the present invention may be any substance (or mixture of such substances) whose molecule contains at least one polymerizable ethylenic double bond that is capable of copolymerizing with a polymerizable unsaturated polyhydric alcohol-polycarboxylic acid polyester. The polymerizable ethylenic double bond or plurality of polymerizable ethylenic double bonds may be contained in radicals of unsaturated acids, such as maleic, fumaric, citraconic and mesaconic acids, or in other unsaturated radicals such as vinyl, allyl and crotyl radicals. These unsaturated radicals may be connected directly to carbon atoms in the molecule, or may be connected to the rest of the molecule by ester, ether or amide linkages.

A polymerizable unsaturated monomeric substance whose molecule contains only one polymerizable ethylenic double bond may be a vinyl compound such as styrene, or p-methyl styrene, 2,4-dimethyl styrene, 2,3-dimethyl styrene, 2,5-dimethyl styrene, isopropenyl toluene, vinyl naphthalene, vinyl benzoate, vinyl dibenzofuran or acrylonitrile; or an alkyl ester or the amide of a monobasic acid whose molecule contains one ethylenic double bond or the aldehyde corresponding to such an acid, such as methyl acrylate, methyl methacrylate, isobutyl methacrylate, methacrolein, acrolein, acrylamide, methacrylamide, crotonaldehyde, or cinnamaldehyde; or an ester of a monohydric alcohol whose molecule contains one ethylenic double bond with a saturated monobasic acid, e. g., allyl lactate or crotyl glycolate.

A polymerizable unsaturated monomeric substance whose molecule contains two or more polymerizable ethylenic double bonds may be an ester of a monohydric alcohol whose molecule contains one polymerizable ethylenic double bond with a monobasic acid whose molecule contains one polymerizable ethylenic double bond (e. g., allyl acrylate or allyl methacrylate); or an ester or mixed ester of a molecule of a saturated dihydric alcohol with two molecules of a monobasic acid whose molecule contains one polymerizable ethylenic double bond (e. g., ethylene dimethacrylate, triethylene dimethacrylate, propylene dimethacrylate, hexamethylene dimethacrylate); or an ester or mixed ester of two alcohol molecules, each consisting of a molecule of allyl, crotyl, alpha-methyl allyl, methallyl, beta-chloro allyl or beta-methyl crotyl alcohol, with a molecule of any of the dibasic acids listed in Table I below.

Table I $$HC-\underset{\underset{HC-C-OH}{\overset{O}{\|}}}{\overset{\overset{O}{\|}}{C}}-OH$$

Maleic acid $$Cl-\underset{\underset{HC-C-OH}{\overset{O}{\|}}}{\overset{\overset{O}{\|}}{C}}-OH$$

Chloromaleic acid $$Br-\underset{\underset{HC-C-OH}{\overset{O}{\|}}}{\overset{\overset{O}{\|}}{C}}-OH$$

Bromomaleic acid $$HO-\overset{O}{\overset{\|}{C}}-CH \atop \underset{HC-C-OH}{\overset{O}{\|}}$$

Fumaric acid $$HO-\overset{O}{\overset{\|}{C}}-C-Cl \atop \underset{HC-C-OH}{\overset{O}{\|}}$$

Chlorofumaric acid $$HO-\overset{O}{\overset{\|}{C}}-C-Br \atop \underset{HC-C-OH}{\overset{O}{\|}}$$

Bromofumaric acid $$HO-\overset{O}{\overset{\|}{C}}-C-CH_3 \atop \underset{HC-C-OH}{\overset{O}{\|}}$$

Mesaconic acid $$CH_3-\overset{O}{\overset{\|}{C}}-\overset{O}{\overset{\|}{C}}-OH \atop \underset{HC-C-OH}{\overset{O}{\|}}$$

Citraconic acid $$HO-\overset{O}{\overset{\|}{C}}-\overset{CH_2}{\overset{\|}{C}}-CH_2-\overset{O}{\overset{\|}{C}}-OH$$

Itaconic acid $$HO-\overset{O}{\overset{\|}{C}}-OH$$

Carbonic acid $$HO-\overset{O}{\overset{\|}{C}}-\overset{O}{\overset{\|}{C}}-OH$$

Oxalic acid $$HO-\overset{O}{\overset{\|}{C}}-CH_2-\overset{O}{\overset{\|}{C}}-OH$$

Malonic acid

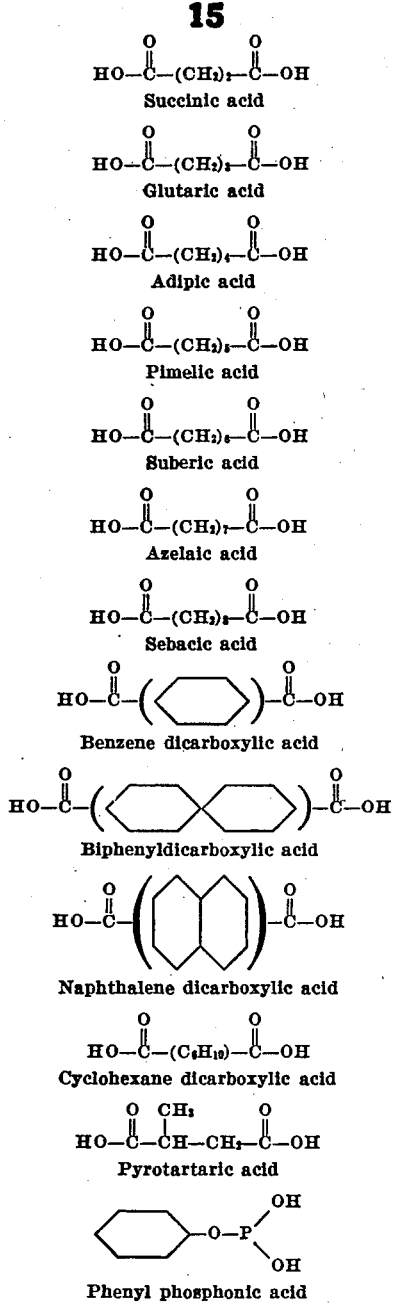

"Benzene dicarboxylic acid" in the foregoing table includes o-, m-, and p-phthalic acid. Similarly, the enclosure of the biphenyl ring and the naphthalene ring in parentheses in the above table is intended to indicate that any of the various position isomers may be used. In the case of cyclohexane dicarboxylic acid, any of the various position isomers may be used either in cis or in trans relationship.

The polymerizable unsaturated monomeric substance may also be an ester of a molecule of one of the dibasic acids listed in Table I with one molecule of a saturated monohydric alcohol such as methyl, ethyl, n-propyl, isopropyl, n-butyl, isobutyl, secondary butyl or tertiary butyl alcohol or Cellosolve and one molecule of one of the unsaturated monohydric alcohols hereinbefore described. For example, allyl Cellosolve maleate is useful as a monomer in the present invention.

The polymerizable monomeric compound may also be an ester or mixed ester of a molecule of a tribasic or other polybasic organic or inorganic acid with three or more monohydric alcohol molecules each having a polymerizable ethylenic double bond. Such monomeric compounds include triallyl tricarballylate, triallyl aconitate, triallyl citrate, triallyl phosphate, trimethallyl phosphate, triallyl cyanurate, and tetrallyl silicate.

The polymerizable monomeric compound may also consist of an ester of two substances that will be described, one of which has a carboxy group and the other of which has an alcoholic hydroxy group. The substance having a carboxy group may have the general formula F—OH, in which F is the acid radical of acrylic, methacrylic, or alpha-chloracrylic acid, or may have the general formula R—O—D—OH, in which R is methyl, ethyl, n-propyl, isopropyl, n-butyl, isobutyl, secondary butyl or tertiary butyl, and D is the divalent acid radical of any of the first nine dibasic acids listed in Table I. When R in the latter general formula is allyl, crotyl, alpha-methyl allyl, methallyl, beta-chloro allyl or beta-methyl crotyl, D may be the divalent acid radical of any of the dibasic acids listed in Table I.

The substance having an alcoholic hydroxy group may consist of a compound having the general formula

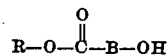

in which R is the monovalent hydrocarbon radical or monovalent chlorinated hydrocarbon radical of any of the alcohols listed in Table II, below, and in which B is methylene, methyl methylene, or any phenylene radical. The substance having an alcoholic hydroxy group may also consist of a compound having the general formula R—O—D—O—E—OH in which D is the divalent acid radical of any of the dibasic acids listed in Table I, R has the same significance as in the preceding general formula and E is the divalent radical to which two hydroxy groups are attached in any of the dihydroxy compounds listed in Table III below.

*Table II*

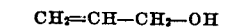
Allyl alcohol

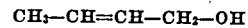
Crotyl alcohol

Alpha-methyl allyl alcohol

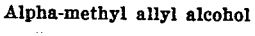
Methallyl alcohol

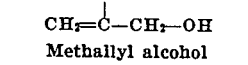
Beta-chloro allyl alcohol

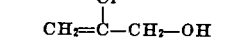
Beta-methyl crotyl alcohol

*Table III*

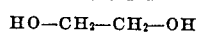
Ethylene glycol

Propylene glycol

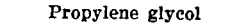
1,2-butylene glycol

OH OH
|  |
CH₃—CH—CH—CH₃

2,3-butylene glycol

HO—(CH₂)₃—OH

Tri-methylene glycol

HO—(CH₂)₄—OH

Tetra-methylene glycol

HO—(CH₂)₅—OH

Penta-methylene glycol

HO—(CH₂)₆—OH

Hexa-methylene glycol

HO—(CH₂)₇—OH

Hepta-methylene glycol

HO—(CH₂)₈—OH

Octa-methylene glycol

HO—CH₂—CH₂—O—CH₂—CH₂—OH

Diethylene glycol

HO—(CH₂—CH₂—O)₂—CH₂—CH₂—OH

Triethylene glycol

HO—(CH₂—CH₂—O)₃—CH₂—CH₂—OH

Tetraethylene glycol

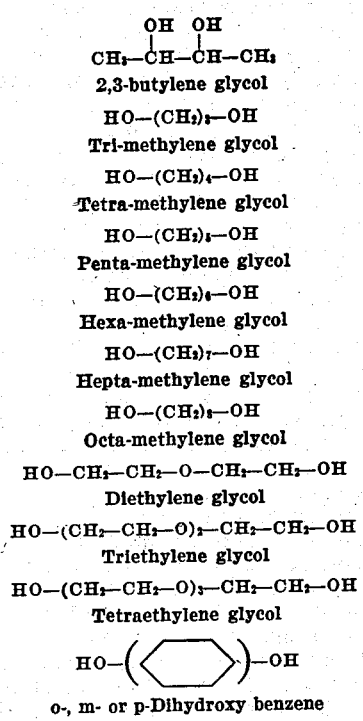

o-, m- or p-Dihydroxy benzene

Such a polymerizable monomeric carbon compound thus has the general formula $$F-O-B-\overset{\overset{O}{\|}}{C}-O-R$$
$$F-O-E-O-D-O-R$$
$$R-O-D-O-B-\overset{\overset{O}{\|}}{C}-O-R$$

or $$R-O-D-O-E-O-D-O-R$$

Polymerizable monomeric compounds having the general formula F—O—E—O—D—O—R may be prepared by first reacting one molecule of a dihydroxy compound listed in Table III with one molecule of the monochloride of a half ester of one of the dibasic acids listed in Table I with one of the alcohols listed in Table II, or in some cases of the half ester itself. (For example, a molecule of allyl chlorcarbonate, which has been prepared by reacting one molecule of allyl alcohol with a molecule of phosgene, may be reacted with a molecule of diethylene glycol.) One molecule of the resulting product may then be reacted with one molecule of the chloride of acrylic, methacrylic or alpha-chloracrylic acid or in some cases of the acid itself.

Polymerizable monomeric compounds having the general formula $$R-O-D-O-B-\overset{\overset{O}{\|}}{C}-O-R$$

include the diallyl ester of lacto-carbonate and the diallyl ester of hydroxy-aceto-carbonate. Other compounds having this general formula, as well as polymerizable monomeric compounds having the general formula $$F-O-B-\overset{\overset{O}{\|}}{C}-O-R$$

may be prepared by reacting one molecule of an ester of an alcohol listed in Table II with a monobasic hydroxy-substituted, chloro-substituted or bromo-substituted acid, such as glycolic acid, chloracetic acid, lactic acid, alpha-bromo propionic acid or hydroxy benzoic acid, (e. g., allyl lactate or crotyl glycolate) with one molecule of a derivative of acrylic, methacrylic or alpha-chloracrylic acid or with one molecule of a derivative of a half ester of one of the dibasic acids listed in Table I with one of the alcohols listed in Table II. In the case of the first nine dibasic acids listed in Table I, the half ester may also be a half ester of methyl, ethyl, propyl, isopropyl, n-butyl, isobutyl, secondary butyl or tertiary butyl alcohol.

Polymerizable monomeric compounds having the general formula $$R-O-D-O-E-O-D-O-R$$

include: diallyl ethylene glycol dioxalate, diallyl ethylene glycol dicarbonate, diallyl diethylene glycol dicarbonate, diallyl trimethylene glycol dicarbonate, diallyl ethylene glycol disuccinate, diallyl ethylene glycol, diadipate, diallyl diethylene glycol dimaleate, dimethallyl diethylene glycol dicarbonate, diallyl diethylene glycol dimalonate, 2-(oxycarballyloxy) ethyl ethyl fumarate and 2-(oxycarbomethallyloxy) ethyl methyl fumarate.

The polymerizable monomeric carbon compound may also consists of an ester of a molecule of any of the dibasic acids listed in Table I with two similar molecules (or a mixed ester of a molecule or such a dibasic acid with two dissimilar molecules) each of which is an ester of glycolic, lactic or o-, m- or p- hydroxy benzoic acid with any of the alcohols listed in Table II. Such a polymerizable monomeric carbon compound has the general formula $$R-O-\overset{\overset{O}{\|}}{C}-B-O-D-O-B-\overset{\overset{O}{\|}}{C}-O-R$$

An amino acid such as glycine may be used in place of lactic, glycolic or o-, m- or p-hydroxy benzoic acid, so that the general formula is then $$R-O-\overset{\overset{O}{\|}}{C}-B-NH-D-NH-B-\overset{\overset{O}{\|}}{C}-O-R$$

Such monomeric compounds include: carbonyl bis(methallyl lactate), carbonyl bis(crotonyl lactate), carbonyl bis(allyl lactate), maleyl bis(allyl lactate), fumaryl bis(allyl lactate), succinyl bis(allyl lactate), adipyl bis(allyl lactate), sebacyl bis(allyl lactate), phthalyl bis(allyl lactate), fumaryl bis(allyl glycolate), carbonyl bis(allyl glycolate), carbonyl bis(allyl salicylate) and oxalyl bis(allyl glycinate).

The polymerizable monomeric carbon compound may also consist of an ether of two similar or dissimilar molecules each consisting of an ester of glycolic, lactic or o-, m- or p-hydroxy benzoic acid with any of the alcohols listed in Table II. Such a polymerizable monomeric carbon compound has the general formula $$R-O-\overset{\overset{O}{\|}}{C}-B-O-B-\overset{\overset{O}{\|}}{C}-O-R$$

Monomeric compounds having this general formula include: the esters of alcohols listed in Table II with diglycolic acid, with diethyl ether alpha, alpha'-dicarboxylic acid, or with any diphenyl ether dicarboxylic acid in which each of the benzene rings has one carboxyl group attached to it. In the preparation of such a compound, an ether of two hydroxy-substituted acid molecules may first be prepared by reacting the sodium derivatives of glycolic, lactic or any hydroxy-benzoic acid with chloracetic or alpha-chlorpropionic acid in accordance with the usual procedure for preparing ethers. The product may then be esterified with any of the alcohols listed in Table II. If it is desired to prepare a compound of this type whose molecule is an ester of two different alcohols, it may be more convenient to prepare an ester of one of the alcohols listed in Table II with glycolic, lactic or hydroxy-benzoic acid, and then to react the sodium derivative of such ester with the ester of a different alcohol listed in Table II and chloracetic or alpha-chlorpropionic acid, to form the ether linkage.

The polymerizable monomeric carbon compound may also consist of an ether of a molecule of ethylene glycol, propylene glycol, 1,2-butylene glycol, 2,3-butylene glycol, or o-, m- or p-dihydroxy benzene with two similar or dissimilar molecules each consisting of an ester of glycolic, lactic or o-, m- or p-hydroxy benzoic acid with any of the alcohols listed in Table II. Such a polymerizable monomeric carbon compound has the general formula

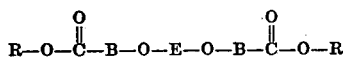

A compound having the general formula

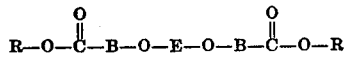

may be prepared by reacting one molecule of a sodium derivative of ethylene, propylene or a butylene glycol or of a hydroxy benzene with two molecules of an ester of chloracetic acid or alpha-chloropropionic acid with one of the alcohols listed in Table II, in accordance with the usual procedure for preparing ethers. If an unsymmetrical compound having this general formula is desired, one molecule of the ester of chloracetic or alpha-chloropropionic acid may be reacted with one molecule of the sodium derivative and the product may then be reacted with one molecule of a different ester of such an acid. As an alternative method, one molecule of the dichloro or dibromo compound corresponding to ethylene, propylene or a butylene glycol may be reacted with two molecules of the sodium derivative of the ester of glycolic, lactic or a hydroxy benzoic acid with one of the alcohols listed in Table II.

The polymerizable monomeric compound may also consist of an ester of a molecule of silicic acid with four molecules of an ester of glycolic or lactic acid with any of the alcohols listed in Table II. Such a polymerizable monomeric carbon compound has the general formula

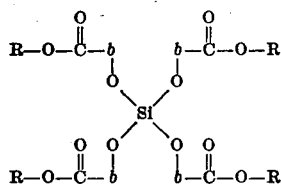

in which $b$ is methylene or methyl methylene and R has the same significance as before. Such compounds include tetra(allyl glycolate) silicate and tetra(allyl lactate) silicate.

PREPARATION OF STABILIZED COMPOSITION

In a stabilized thermosetting composition of the present invention the proportion of filler to polymerizable binder (i. e., polymerizable unsaturated polyester or mixture thereof with a polymerizable unsaturated monomeric compound or with other substances which may or may not be polymerizable) varies with the specific characteristics of the binder and filler and with the desired physical form of the composition.

In general, the proportion of an organic filler may range from about 40 to about 75 per cent of the thermosetting composition. (As used herein the terms "per cent" and "parts" means per cent and parts by weight unless otherwise designated.) Usually, it is preferable that the proportion of an organic filler be within a range of about 50 to 65 per cent of the composition, and it is most desirable that it be about 60 per cent of the composition. The proportion of an inorganic filler may range from about 40 to about 85 per cent of the thermosetting composition, but it is usually preferable that it be within a range of about 60 to 70 per cent of the composition. However, these ranges vary with the specific characteristics of the polymerizable binder in the composition and with the form in which the binder (along with the catalyst and stabilizer) is carried on the filler in contact with air.

For example, when a stabilized thermosetting composition of the invention is prepared using a relatively hard polymerizable binder, the proportion of filler may be relatively low. However, even such a binder is not entirely crystalline and still contains some tacky liquid, so that a filler is necessary in order to carry it in contact with air. Grinding of a filler impregnated with such a binder, to produce particles in which the binder is carried in contact with air, is possible even when from about 20 to about 30 per cent of the polymerizable binder consists of a polymerizable monomeric substance. The proportion of filler may be as large as it is possible to employ while still permitting the material to be held together by the binder in the form of a coherent finished article. The maximum proportion of filler that can be employed depends upon the absorbency of the filler, because an absorbent filler reduces the apparent proportion of binder by absorbing more of the binder.

In the preparation of a composition having the form of a dough or putty which can be rolled into sheets or extruded in rods or ribbons which are soft enough to be placed directly in the mold, the proportion of filler to prepare a dough of a given consistency varies with the absorbency of the filler and with the tackiness of the binder.

When it is desired to prepare a powdery thermosetting composition having essentially the form of the finely divided filler, an absorbent filler is added to a liquid binder of sufficiently low viscosity so that the filler can absorb a large amount of the binder. It is evident that a much lower proportion of a highly absorbent filler would be required to absorb the binder than would be required with a less absorbent filler.

If too large a proportion of filler is used with a tacky, viscous binder the binder will not coat the filler so as to form a dough or solid mass which can be rolled into sheets, but instead there will be formed a damp powder which is essentially a mixture of impregnated filler with unimpregnated filler. Such a composition may still be useful, for at molding temperatures the viscosity of the resin is decreased so that the resin may then flow and uniformly impregnate the filler.

When a composition is desired that will form sheets having a leathery texture which can be easily chopped into particles, the proportion of filler required to impart a leathery texture varies with the tackiness of the binder and with the absorbency of the filler, as well as with the specific leathery texture desired. That is, the proportion may range from the minimum amount of filler required to reduce the tackiness of the material to such an extent that fine particles thereof will not coalesce, to the maximum amount of filler that may be used without converting the material to a non-cohesive mass containing such a small amount of the polymerizable binder that it does not function as a binder (i. e., that it will not hold the material together to form a coherent finished article). Thus it is apparent that the amount of filler which may be used may be predetermined readily by experiment and that the specific leathery texture which it is desired to impart to the material may be obtained by the use of a predetermined amount of filler or simply by admixture of the filler during a milling operation until the desired leathery texture of the material is obtained.

A typical unsaturated polyester which may be used as a polymerizable binder in the practice of the invention is one prepared by the reaction of 0.2 mol of phthalic anhydride and 0.8 mol of maleic anhydride with 1.05 mols of ethylene glycol according to the procedure described hereinbefore. The amount of filler required to impart a leathery texture to such a polyester depends on the type of filler used as well as on the presence of other ingredients admixed with the polyester.

For example, if a cellulose filler (e. g., alpha-cellulose) is used, it can be used in amounts ranging from about 40 to about 60 per cent of the polyester in order to obtain a leathery material. If about one-fifth of the polyester is replaced by a polymerizable liquid monomer (e. g., diallyl phthalate), the amount of cellulose filler required to obtain a leathery material ranges from about 55 to about 75 per cent of the polyester-monomer composition. Thus, it can be seen that addition of a monomer to the polyester, which reduces the viscosity of the polyester, makes it necessary to add a substantially greater amount of filler to obtain a leathery material.

By comparison, if a mineral fiber filler (e. g., asbestos), is used in the practice of the invention, it can be used in amounts ranging from about 50 to about 70 per cent of the polyester in order to obtain a leathery material. If about one-fifth of the polyester is replaced by the polymerizable liquid monomer, the amount of mineral fiber filler required to obtain a leathery material ranges from about 65 to about 80 per cent of the polyester-monomer composition. Thus it can be seen that a mineral fiber filler, which is much less absorbent than a cellulose filler, must be used in a greater amount than a cellulose filler in order to obtain a leathery material.

The behavior of non-fibrous mineral fillers such as clay, mica, talc and calcium silicate is different from the behavior of a cellulose filler or a mineral fiber filler. For example, if a non-fibrous mineral filler is used in the practice of the invention, it is used in amounts ranging from about 60 to about 80 per cent of the polyester in order to obtain a leathery material. If about one-fifth of the polyester is replaced by the polymerizable liquid monomer the amount of non-fibrous mineral filler required to obtain a leathery material ranges from about 70 to about 85 per cent of the polyester-monomer composition.

Ordinarily in the preparation of a material having a leathery texture the polyester used is non-crystalline. However, the polyester used need only be non-crystalline while a leathery texture is being imparted to the material. If the polyester is of a type that does undergo crystallization, it may be used to produce a leathery sheet at any time before appreciable crystallization takes place, i. e., while it remains non-crystalline. Crystallization of the polyester in the leathery material may then take place before or after the material is chopped into particles.

As hereinbefore stated, from the standpoint of economy of time and money it is desirable that a thermosetting composition when received by the user contain a catalyst that promotes rapid polymerization of the composition at molding temperatures. However, a curing catalyst incorporated in a thermosetting composition in an amount sufficient to cause the composition to cure completely at molding temperatures so as to produce fully cured molded articles heretofore has had the effect of promoting polymerization at atmospheric temperatures to such an extent that after storage for short periods the composition becomes a substantially infusible, worthless mass that cannot be formed into any useful product. Even during shipment such a thermosetting composition may become at least partially set up so that it is contaminated with hard spots of polymerized material. A few hard "stones" or precured granules may damage an expensive mold, and also may cause defective spots in pieces molded from such material which are readily apparent even to an inexperienced observer. Such spots make a molded piece unsatisfactory for commercial use.

The use of a smaller amount of curing catalyst than is normally required for complete cure at molding temperatures may be effective in preventing polymerization of the composition to an infusible worthless mass. However, there is a proportionate loss in the water resistance, strength, electrical properties and general quality of articles molded from the composition. During storage some of the catalyst, which is in a reduced proportion to start with, appears to decompose so that the curability becomes progressively worse until the composition becomes a worthless unpolymerizable mass. The addition of an "inhibitor" in place of omission of part of the catalyst has the same undesirable effect—when an ordinary inhibitor is used in an amount sufficient to prevent polymerization of the composition at atmospheric temperatures to an infusible worthless mass, the inhibiting action remains in effect during fabrication of articles from the composition and interferes with polymerization during fabrication; during storage of the composition over a period of time the inhibitor in effect "uses up" the catalyst so that the composition eventually becomes a worthless unpolymerizable mass.

A thermosetting composition embodying the invention having incorporated therein a curing catalyst is "stable" at atmospheric temperatures because it contains a stabilizer (as hereinbefore defined) and because a filler carries the other ingredients (the polymerizable binder, the catalyst and the stabilizer) in contact with air. A thermosetting composition embodying the invention is "stable" during storage under ordinary conditions for a given period in that it meets both of the following conditions during that period: (1) the composition neither polymerizes to a hard unusable mass nor are there developed appreciable lumps or "hard centers" which will produce defective spots in pieces molded from such material and (2) the composition retains its plasticity and curability so that it can be molded into pieces having a cured quality that is unimpaired by such storage (i. e., the composition cures completely at molding temperatures in a very short time to hard pieces that are resistant to water and to deterioration and cracking from heat, etc.).

A composition embodying the invention is stable for over two months. This means that when the material has been stored at atmospheric temperatures for two months it is soft and free from "hard centers" or precured granules that damage the mold, and can be molded into pieces having a cured quality that is unimpaired by such storage. During storage after two months hard lumps of material may start to form and/or the curability of the material may start to decrease, but the material may still be quite satisfactory for commercial use for three months of storage. After three months of storage the material may not be stable, i. e., "hard centers" or precured granules may develop sufficiently to cause defective spots in a molded piece that make the piece unsatisfactory for commercial use, and/or the curability of the material may decrease to such an extent that the cured quality of the molded material is not good enough for it to be considered commercially useful.

A thermosetting composition embodying the invention rarely polymerizes during storage at atmospheric temperatures to a hard worthless mass. Instead it may become "unstable" because the curability of the material decreases. When the stability fails after a long period of storage by reason of loss of curability, such loss of curability may be due to the fact that the catalyst starts to decompose after such a period, so that the material does not cure properly because the proportion of curing catalyst is too low. A composition which does not contain a stabilizer and contains instead such a small amount of catalyst that polymerization does not occur at atmospheric temperatures would fail by reason of loss of curability after a shorter period, because the catalyst proportion is less to start with.

The proportion of curing catalyst used in the practice of the invention is simply the proportion that causes the composition to polymerize at the desired rate, and, as the term "catalyst" implies, such proportion is the usual catalytic amount, i. e., ranging from about 0.01 per cent to about 5 per cent of the polymerizable binder. It is ordinarily not desirable to use a concentration of catalyst larger than about 5 per cent of the polymerizable binder in an attempt to increase the curability at molding temperatures, because beyond a certain concentration, which varies for specific catalysts, the catalytic effect no longer increases and remains approximately constant. There is also a greater tendency for a composition containing an excess of curing catalyst to polymerize at atmospheric temperatures, so that unless the amount of stabilizer used in a thermosetting composition embodying the invention to prevent curing of the composition at atmospheric temperatures is also increased, the stability of the composition will be reduced. Furthermore, it is wasteful to use a large excess of curing catalyst because the rate decomposition of the catalyst appears to increase with its concentration, so that the greater the amount of catalyst, the more rapidly it appears to be lost during storage.

The preferred proportion of curing catalyst varies with different catalysts, and the amount of a specific curing catalyst required to produce a given rate of hardening may vary also with variations in the nature of the polymerizable composition. Benzoyl peroxide, which is preferred in the practice of the present invention, is desirably used in a concentration ranging from about 1 to about 3 per cent of the polymerizable binder.

The proportion of stabilizer in a thermosetting composition embodying the invention must be large enough to make the composition sufficiently stable at atmospheric temperatures to be commercially useful, but must not be so large that inhibiting effect is produced at molding temperatures. That is when too large an amount of stabilizer is present, polymerization of the composition is retarded at atmospheric temperatures, but there is a proportionate decrease in the curability at molding temperatures. The effect contributed by oxygen, which is essential to obtain any stabilization in the practice of the present invention, disappears when the material is heated during fabrication to the temperatures at which polymerization is usually carried out, e. g., 250 to 300 degrees F. Similarly, at high temperatures the effect of the stabilizer is overcome provided there is not too much stabilizer present. Apparently at room temperature the stabilizer either prevents the formation of free radicals which might initiate polymerization, or prevents free radicals from activating the unsaturated compounds. At high temperatures the stabilizer is not effective against the free radicals, so that while a thermosetting composition may be stable at atmospheric temperatures, it suffers no loss of curability at molding temperatures. However, when too much stabilizer is present it may be sufficiently active at molding temperatures to destroy too many free radicals, so that the curability is reduced.

The proportion of stabilizer in a thermosetting composition embodying the invention may vary in accordance with the stability required of the composition. Ordinarily the proportion of stabilizer is such as to permit the composition to remain "stable" (as hereinbefore defined) at atmospheric temperatures for approximately two months or more. Thermosetting compositions which are stable for periods shorter than two months are not considered to be commercially useful. Thus, the maximum proportion of stabilizer in a thermosetting composition is that which is so large as to affect seriously the cured quality of the composition after two months' storage at atmospheric temperatures, so that the composition is not "stable" (as hereinbefore defined) after two months. The minimum proportion of stabilizer is that which is so small as to be ineffective in retarding the polymerization of the composition after two months' storage at atmospheric temperatures without a proportionate decrease in curability, so that the composition is not "stable" after two months. The proportion of stabilizer that may be used in the practice of the present invention differs with specific stabilizers as well as with the properties of the polymerizable binder and with the proportion and efficiency of the catalyst. For example, when N-phenyl-2-hydroxy-3-naphthamide or N-tolyl-2-hydroxy-3-naphthamide is used as the stabilizer the maximum proportion that may be used is approximately .75 per cent of the polymerizable binder and the minimum proportion is approximately .15 per cent of the polymerizable binder. It is usually preferable that the proportion of the stabilizer be within the range .3 to .6 per cent of the polymerizable binder. However, these ranges only indicate the practical proportions of such stabilizers that may be used to prepare a stabilized thermosetting composition embodying the invention containing the amount of curing catalyst ordinarily used and containing a polyester having ordinary properties. For example, although the minimum proportion of a specific stabilizer ordinarily gives a composition having a stability of at least two months, with a large amount of catalyst the stabilizer might have to be used in a larger proportion to produce the same stability; on the other hand, when the polymerizable binder has relatively less tendency to polymerize at atmospheric temperatures, the same proportion of the stabilizer might produce a stability of longer than two months.

The stabilizing effect produced by a specific stabilizer differs with various polymerizable unsaturated monomeric substances, as hereinbefore described, that may be present in the polymerizable binder. At molding temperatures such a monomeric substance often seems to aid in overcoming the stability toward polymerization produced by the stabilizer at atmospheric temperatures. The stabilizer neutralizes or immobilizes free radicals at atmospheric temperatures but is ineffective against the free radicals at molding temperatures, so that it does not decrease the curability of the composition at molding temperatures. The monomeric substance copolymerizes with the unsaturated polyester through ethylenic double bonds by means of chain reactions initiated by the free radicals so that at molding temperatures the monomeric substance aids in curing the composition.

The proportion of monomeric substance in the polymerizable binder that may be used in a thermosetting composition of the invention varies in accordance with the physical form of the composition as well as with the proportion and effectiveness of the stabilizer employed. In general, when less than 2 per cent of the polymerizable binder consists of a polymerizable monomeric substance, the monomer may be ineffective in helping to cross-link the straight chain polyester molecules at molding temperatures. Thus, it is desirable that the monomer comprise at least 2 per cent of the polymerizable binder, and the proportion of monomer may be as high as 98 per cent of the polymerizable binder. In preparing a composition which has essentially the original form of the filler by impregnating an absorbent filler with a very limpid resin, it is necessary that at least 20 per cent of the polymerizable binder be a liquid monomer in order that the binder may have sufficiently low viscosity so that it can be absorbed readily by the filler, and it is usually preferable that at least 40 to 50 per cent of the binder consist of a polymerizable unsaturated monomeric substance. A granular thermosetting composition which contains a polymerizable binder that consists of approximately 10 to 30 per cent of a polymerizable monomeric compound and about 70 to 90 per cent of a polymerizable polyester produces a final polymerized product that has excellent water resistance and insolubility due to the presence of the monomeric compound.

In order to compare the effectiveness of various stabilizers which may be used in the preparation of a stabilized thermosetting composition embodying the invention, sheets of a putty-like material containing one of the stabilizers described hereinbefore are prepared and tested for stability as follows: (The stabilizers employed are listed in the first column of Table IV, and the second column of Table IV indicates the amount used which is approximately the optimum proportion for such a composition.)

A polymerizable binder, consisting of 23.6 parts of a polymerizable unsaturated polyester (prepared by esterifying 12.5 mol per cent of propylene glycol and 87.5 mol per cent of ethylene glycol with 20 mol per cent of phthalic anhydride and 80 mol per cent of maleic anhydride by the procedure hereinbefore described to an acid number of 35) and 9.2 parts of a polymerizable unsaturated liquid monomer (diallyl phthalate), is mixed in a Banbury mixer with 1.3 parts of "Luperco ATC" catalyst (a paste consisting of 50 per cent benzoyl peroxide and 50 per cent tricresyl phosphate), 2 parts of a lubricant (zinc stearate), a filler consisting of 48 parts of clay and 20 parts of asbestos, and a stabilizer. The mixing is continued until a soft, homogeneous dough is obtained. The material is then passed through warm rubber rolls to form sheets of a thickness of approximately ⅛ inch. The sheets are cooled and stored in closed containers at 90 degrees F. and at 30 to 50 per cent relative humidity to determine the length of time for which the dough may be stored before it can no longer be considered stable (i. e., to determine the moldable life of the material). (Such conditions are more extreme than the conditions to which the user would ordinarily subject the material. At room temperature the stability is, of course, much better.)

The use of a dough in moldable life tests is particularly advantageous, since by simply feeling the sheeted material it is possible to obtain a clear indication of the size, amount and character of any lumps or "hard centers" which develop during storage. At intervals during storage, in addition to feeling sheets of the material, samples of the putty-like sheets are tested for cured quality by molding the samples in a small tumbler mold at ordinary pressures (e. g., 1000–2000 pounds per square inch of projected area). The small tumbler so molded weighs about 13 grams and is 1½ inches high, having a top diameter of 1¾ inches and a bottom of 1 $\tfrac{7}{16}$ inches.

The results of the tests are shown in the third column of Table IV. The figures represent the number of months for which the dough containing a stabilizer indicated in the first column in an amount indicated in the second column is "stable," as hereinbefore defined.

For the sake of comparison, sheets of the same dough which contain no stabilizer are also prepared and tested by the procedure described hereinbefore. This material is the control indicated in Table IV. From the results shown in Table IV it is readily apparent that thermosetting compositions embodying the invention are stable for much longer periods at atmospheric temperatures than are compositions which are the same except that they do not contain one of the stabilizers used in the practice of the present invention.

Table IV

| Stabilizer | Amount (parts) | Months Stable |
|---|---|---|
| N-phenyl-2-hydroxy-3-naphthamide | .13 | over 2 |
| N-p-tolyl-2-hydroxy-3-naphthamide | .13 | over 2 |
| (Control) | | 1 |

In the preparation of a thermosetting composition embodying the invention the polymerizable binder, catalyst, stabilizer and filler are mixed in the proper proportions to obtain a homogeneous composition having the desired consistency, i. e., a soft dough, or a material having a leathery texture, etc. Mixing of a filler with the other ingredients may be carried out in any suitable mixing or kneading apparatus, e. g., by using a commercial mixer or by milling the filler into the material on a rubber mill. The process of milling the filler into the material is particularly adaptable to the preparation of a material having a leathery texture because the change in the material from a tacky to a non-tacky, leathery texture can be detected very readily during the milling process, since a tacky material adheres firmly to the rolls whereas a leathery material has a tendency to slip on the rolls. Mixing may be carried out at room temperature if the binder is not too viscous. If the viscosity of the binder is too great it may be necessary to warm the binder to reduce its viscosity when it is mixed with the filler. In any case, it is desirable to mix the binder in a liquid state with the filler so that the filler becomes thoroughly mixed with the binder.

If the binder in a composition embodying the invention comprises a viscous polymerizable substance and a less viscous polymerizable substance, the polymerization catalyst may be dissolved in the less viscous polymerizable substance before the two substances are mixed. Also, the polymerization catalyst may be dispersed in the filler, as by grinding with the filler in a ball-mill, before the filler is mixed with the binder. A fibrous filler may be impregnated with a solution, in a volatile solvent, of the polymerization catalyst and dried before the filler is mixed with the binder.

The stabilizer ordinarily may be added to the polymerizable binder after the addition of the catalyst. If there is a tendency for the material to polymerize at mixing temperatures when the catalyst is added the stabilizer may be added before the catalyst or with the catalyst. For example, when a binder containing a hard polyester is used it must be warmed in order to reduce its viscosity when it is mixed with the filler. A composition containing a hard polyester, is very desirable, for upon cooling the polyester crystallizes and the material can be cut into small fragments which are relatively non-tacky and do not coalesce when placed in a shipping container. An excellent method for cooling such a composition is to roll it into thin sheets. However, in order to obtain a composition which is soft and plastic enough to be rolled into thin sheets the binder comprising the relatively hard polyester must be heated. Ordinarily during heating the composition containing a polymerization catalyst might polymerize. However, in the practice of the present invention the stabilizer that is added (before adding the catalyst or with the catalyst) functions to prevent polymerization during mixing, as well as during storage at atmospheric temperatures, of a thermosetting composition containing a polymerization catalyst.

The most convenient form for handling the material that is taken from the rolls is in the form of thin sheets. When the material is warm, rolling into thin sheets aids in rapid cooling. Sheets which contain a hard polyester which crystallizes as the sheets are cooled as well as sheets of material having a leathery texture are too stiff to be used in molds in sheet form and are therefore divided into small fragments before storing in a shipping container. The fragments when taken from the container are all ready for molding.

An essential requirement of a stabilized thermosetting composition of the invention is that it be in a form such that the filler carries the other ingredients in contact with air. A material that is hard enough to be chopped into fragments is particularly desirable, for air is readily diffused throughout a material cut into fragments. The maximum diameter of each particle should be no greater than about one-quarter of an inch, and it is desirable that the maximum diameter be one-sixteenth to one-eighth of an inch. The material is minced by subjecting it to a cutting action, as distinguished from a crushing or grinding action. The mincing may be effected by any of the well-known industrial devices for reducing material to particulate form by cutting action. Although one of the simplest methods of mincing the material involves pressing the material through a fine mesh screen, it is preferable from an industrial point of view to employ devices capable of effecting a high speed cutting action. It has been found that when the material is subjected to a high speed cutting action (either by causing rapidly moving blades to strike the material or by causing the material to be thrown at a high speed against stationary blades) the benefit of impact as well as shearing force is obtained and division of the material into fine particles is accomplished in a very satisfactory manner. Industrial devices which employ a high speed cutting action (and which are preferred therefore) include the Abbe cutter, the Wiley mill and the Fitzpatrick comminuting machine.

Immediately after material having a leathery texture is granulated it may be hot from the mincing operation and may, therefore, be more doughy than leathery. Before it is placed in a shipping container it should be cooled, e. g., by passing the particles along on a conveyor belt to restore the non-tacky texture before the fragments are placed in the container.

A dough or putty-like composition formed from a rather viscous tacky binder which is incompletely absorbed by the filler and which tends to coat the filler, unlike the stiff sheets of a leathery material, or a material formed from a relatively hard polyester which tends to crystallize, can be rolled into sheets which are soft and plastic and may be shipped and used in molds without granulating.

The sheets are permitted to cool before being rolled up or folded up and placed in the container. Usually the sheets should not be thicker than one-quarter inch. Although the sheets may be as thin as 0.005 inch to 0.0010 inch, such extremely thin sheets ordinarily are not rigid enough to be self supporting so that air can remain between the sheets, and when packed together in a shipping container tend to coalesce. It is usually desirable that the sheets have a thickness of about one-sixteenth to three-sixteenths inch. When a dough or putty-like material is extruded into rods or ribbons instead of rolling it into a sheet, the particles in the center of such rods or ribbons are a shorter distance from all parts exposed to air than particles in the center of a sheet. It is usually desirable that the maximum thickness of the rods or ribbons be not greater than about one-quarter inch.

A composition comprising a polymerizable polyester is highly advantageous for the molding of articles under pressure. Since a polyerizable polyester is fusible and plastic at a relatively low temperature, it is possible to adjust the amounts of catalyst and stabilizer so that hardening at such a temperature takes place at a reasonable rate to allow ample opportunity for shaping and molding of the composition. Shaping and molding may be completed at such a temperature, and the shaped composition may then be held at the same temperature while slow hardening takes place, or may be heated to a higher temperature to cause quick hardening. These properties are in contrast to those of urea-formaldehyde, melamine-formaldehyde and phenol-formaldehyde resins, which are plastic only at elevated temperatures at which they harden so rapidly that hardening interferes with shaping.

Hardening of a polymerizable polyester can be carried out at a temperature that is far below the decomposition temperature of the polyester and thus at a temperature at which discoloration does not take place. Other heat hardenable products, such as urea-, melamine- or phenol-formaldehyde products, must be heated much closer to their decomposition temperatures in order to cause hardening to take place even at moderate speed. When an attempt is made to harden such other products rapidly by raising the hardening temperature, discoloration or "burning" is likely to result.

A polymerizable polyester may be fabricated in an injection molding machine. A supply of the polyester containing the curing catalyst may be held in the supply cylinder of the machine at a temperature at which the composition is highly plastic but hardens very slowly, and the mold may be held at a temperature at which the composition hardens rapidly. Under such conditions the mold may be filled rapidly from the supply cylinder by injection of the composition under pressure. The composition may harden so rapidly at the temperature of the mold that the finished hardened piece may be removed almost immediately after the mold has been filled. Thus very rapid automatic operation of the machine is possible. The main difference between such an operation and the ordinary operation of injection molding a thermoplastic material is that in the injection molding of the polymerizable polyester the mold is at a higher temperature than the supply cylinder, whereas in injection molding of a thermoplastic material the mold is at a lower temperature than the supply cylinder.

Thus a polymerizable polyester can be molded as economically as a thermoplastic material. The molding of other heat hardenable products is a much slower and more expensive operation than the molding of a thermoplastic material.

Care should be taken that any material incorporated in a composition embodying the invention does not tend to cause the composition to set up during its preparation or during storage (e. g., carbon black is undesirable for this reason). In the preparation of a molding composition, plasticizers, lubricants, fillers, pigments and other coloring matter may be incorporated if desired.

The following examples illustrate the preparation of a stabilized thermosetting composition carried on a filler in contact with air.

Example 1

A polymerizable binder, consisting of 58 parts of a polymerizable unsaturated polyester that is hard at ordinary temperatures (prepared by esterifying equivalent proportions of ethylene glycol and maleic anhydride by the procedure described hereinbefore to an acid number of 35) and 10.25 parts of a polymerizable unsaturated liquid monomer (diallyl phthalate), is mixed in a Banbury mixer with 1.4 parts of a catalyst (benzoyl peroxide), a stabilizer (0.26 part of N-phenyl-2-hydroxy-3-napthamide), 4 parts of a lubricant (zinc stearate) and a filler consisting of 63 parts of clay and 62 parts of asbestos. The mixing is continued until a homogeneous dough is obtained. The material is then passed through warm rubber rolls to form sheets which are allowed to cool and crystallize. The crystallized sheets are then chopped in a Fitzpatrick comminuting machine to obtain finely divided particles having a maximum diameter of ¼ inch. The product of the present example remains stable for over 5 months at atmospheric temperatures. A granular composition prepared by a procedure that is the same except that no stabilizer is added remains stable for only 2 to 3 months at atmospheric temperatures.

Example 2

A polymerizable binder, consisting of 58 parts of a polymerizable unsaturated polyester (prepared by esterifying 12.5 mol per cent of propylene glycol and 87.5 mol per cent of ethylene glycol with an equivalent proportion of maleic anhydride by the procedure described hereinbefore to an acid number of 35) and 6 parts of a polymerizable unsaturated liquid monomer (diallyl maleate), is mixed in a Banbury mixer with a finely divided powdered intimate mixture containing 1.3 parts of a catalyst (benzoyl peroxide), 5 parts of a lubricant (zinc stearate), a stabilizer (0.26 part of N-phenyl-2-hydroxy-3-naphthamide) and a filler consisting of 71 parts of clay and 98 parts of asbestos. When a homogeneous mixture is obtained, the material is passed through warm rubber rolls to form sheets having a leathery texture. The sheets are cooled before chopping in a Fitzpatrick comminuting machine to obtain finely divided particles having a maximum diameter of ¼ inch. The product of the present example remains stable at atmospheric temperatures for over 5 months. A leathery, granular composition prepared by a procedure that is the same except that no stabilizer is added remains stable for only 2 to 3 months at atmospheric temperatures.

Example 3

A polymerizable binder, consisting of 15 parts of the polymerizable unsaturated polyester whose preparation is described in Example 2 and 10 parts of a polymerizable liquid monomer (diallyl phthalate), is thoroughly mixed in a Banbury mixer with 0.5 part of a catalyst (benzoyl peroxide), 2 parts of a lubricant (zinc stearate), a stabilizer (0.10 part of N-phenyl-2-hydroxy-3-naphthamide), and a filler consisting of 40 parts of clay and 38 parts of asbestos. The damp powder prepared by this procedure remains stable at atmospheric temperatures for over 5 months. A powdery composition prepared by a procedure that is the same except that no stabilizer is added remains stable for only 3 to 4 months at atmospheric temperatures.

Having described the invention, I claim:

1. A stabilized thermosetting composition, comprising (1) a polymerizable unsaturated alkyd resin; (2) a catalyst of the class consisting of organic peroxides and organic ozonides; and, (3) as an agent for increasing the stability of the composition at atmospheric temperatures without proportionately decreasing the curability of the composition, an N-aryl-hydroxy-3-naphthamide in which each nitrogen atom is connected only to atoms other than nitrogen and oxygen, and in which any halo substituent has an atomic weight greater than 35; carried on a filler in contact with air.

2. A stabilized thermosetting composition as claimed in claim 1 wherein the aryl radical in the 3-naphthamide has six nuclear carbon atoms.

3. A stabilized thermosetting composition as claimed in claim 1 wherein the aryl radical in the 3-naphthamide is a monovalent hydrocarbon radical of the benzene series having not more than seven carbon atoms.

4. A stabilized thermosetting composition as claimed in claim 3 wherein the 3-naphthamide has a hydroxy radical in the 2-position.

5. A stabilized thermosetting composition as claimed in claim 1 wherein the 3-naphthamide has a hydroxy radical in the 2-position.

6. A stabilized thermosetting composition as claimed in claim 1 wherein the agent for increasing the stability is N-phenyl-2-hydroxy-3-naphthamide.

THOMAS F. ANDERSON.

No references cited.